(12) United States Patent
Stamatakis

(10) Patent No.: US 9,476,277 B2
(45) Date of Patent: Oct. 25, 2016

(54) MAGNETIC LEAK MANAGEMENT APPARATUS AND METHODS

(75) Inventor: Emanuel Stamatakis, Houston, TX (US)

(73) Assignee: M-I L.L.C., Houston, TX (US)

( * ) Notice: Subject to any disclaimer, the term of this patent is extended or adjusted under 35 U.S.C. 154(b) by 235 days.

(21) Appl. No.: 13/878,552

(22) PCT Filed: Oct. 6, 2011

(86) PCT No.: PCT/US2011/055164
§ 371 (c)(1),
(2), (4) Date: Jun. 24, 2013

(87) PCT Pub. No.: WO2012/048157
PCT Pub. Date: Apr. 12, 2012

(65) Prior Publication Data
US 2013/0319665 A1   Dec. 5, 2013

Related U.S. Application Data

(60) Provisional application No. 61/391,610, filed on Oct. 9, 2010.

(51) Int. Cl.
| | | |
|---|---|---|
| *E21B 33/038* | (2006.01) | |
| *E21B 29/10* | (2006.01) | |
| *E21B 33/00* | (2006.01) | |
| *E21B 33/13* | (2006.01) | |
| *E21B 41/00* | (2006.01) | |
| *F16L 55/168* | (2006.01) | |

(52) U.S. Cl.
CPC .............. *E21B 29/10* (2013.01); *E21B 33/00* (2013.01); *E21B 33/13* (2013.01); *E21B 41/00* (2013.01); *F16L 55/168* (2013.01)

(58) Field of Classification Search
CPC ........................... E21B 17/028; E21B 47/082
USPC .............................................................. 138/89
See application file for complete search history.

(56) References Cited

U.S. PATENT DOCUMENTS

| | | | | |
|---|---|---|---|---|
| 2,772,804 A | * | 12/1956 | Byrnes | 220/230 |
| 3,652,054 A | * | 3/1972 | Layton | 251/65 |
| 4,671,679 A | * | 6/1987 | Heshmat | 384/133 |

(Continued)

FOREIGN PATENT DOCUMENTS

| | | | | |
|---|---|---|---|---|
| GB | 1379332 A | * | 1/1975 | F16G 3/02 |
| WO | 00-63595 A2 | | 10/2000 | |

OTHER PUBLICATIONS

International Search Report for PCT Application Serial No. PCT/US2011/055164 dated Apr. 20, 2012.

*Primary Examiner* — Giovanna C Wright
*Assistant Examiner* — Ronald Runyan
(74) *Attorney, Agent, or Firm* — David J. Smith

(57) ABSTRACT

Magnetic means for managing and stopping leaks in metal pipes such as well bores and pipe risers is provided. A magnetic leak arrestor comprises a spool with magnetic collar disposed thereabout. The spool has a tapered end for inserting into a pipe riser. The magnetic collar creates a seal with the pipe riser, which may be welded in place, if desired. Additionally, a magnet may be positioned proximate a leak in a side wall of a pipe riser to seal the leak. The magnet may be shaped to conform to the shape of the pipe riser, and a seal gasket provided around an edge portion of the magnet. A slurry of magnetically active material may be provide inside the pipe to seal the leak in the side wall or to provide a blockage in the pipe riser so that killing fluids may be pumped into the well bore, if desired.

6 Claims, 2 Drawing Sheets

(56) References Cited

U.S. PATENT DOCUMENTS

| | | | |
|---|---|---|---|
| 4,750,705 A * | 6/1988 | Zippe | 251/65 |
| 5,188,177 A | 2/1993 | Curry | |
| 2009/0293238 A1 * | 12/2009 | Davis | 24/303 |
| 2011/0186297 A1 * | 8/2011 | Zhang et al. | 166/308.1 |
| 2012/0060940 A1 * | 3/2012 | Francis | E21B 33/02 137/343 |

* cited by examiner

MAGNETIC LEAK MANAGEMENT APPARATUS AND METHODS

FIELD

Embodiments described herein relate to use of magnetism for leak management in metal piping. More specifically, embodiments described herein relate to methods and apparatus for deploying magnets to stop or control leaks in metal piping.

BACKGROUND

Drilling for oil is one of the world's largest industries. Unfortunately, bringing critical energy resources to consumers occasionally results in releasing oil and other substances into the environment. As was clearly demonstrated in the summer of 2010 with the massive oil release in the Gulf of Mexico, effective and efficient means for addressing leaking well bores, pipe risers, and other leaking pipes is still needed.

SUMMARY

Embodiments disclosed herein provide an apparatus for closing a leak from an open pipe with a spool tapered to extend inside the open pipe a magnet configured to produce a magnetic field aligned with a central axis of the pipe, and a valve coupled to the spool.

Other embodiments provide a method of connecting magnetically susceptible pipes by tapering an end of a first pipe to mate with a second pipe, providing a magnetic field in alignment with a central axis of the first pipe and the second pipe, and configuring the magnetic field to provide an attractive force between the first pipe and the second pipe.

Other embodiments provide a method of sealing a leaking pipe by providing a ferromagnetic slurry in the leaking pipe, positioning one or more magnets to direct the ferromagnetic slurry toward an inside surface of the pipe, and using the magnetic field to harden the ferromagnetic slurry against leaks in the inside surface of the pipe.

Other embodiments provide a method of plugging a well bore by providing a slurry of a ferromagnetic material into the well bore, positioning one or more magnets proximate an external surface of the well bore, accumulating the ferromagnetic material inside the well bore at a location adjacent the one or more magnets to form a flow restriction, and providing a plug mixture into the well bore to plug the well bore.

Other embodiments provide a method of plugging a leaking metal pipe by applying a magnet with a gasket over the leak in the metal pipe, sealing the gasket against the metal pipe, and maintaining the seal by the magnetic force of the magnet.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
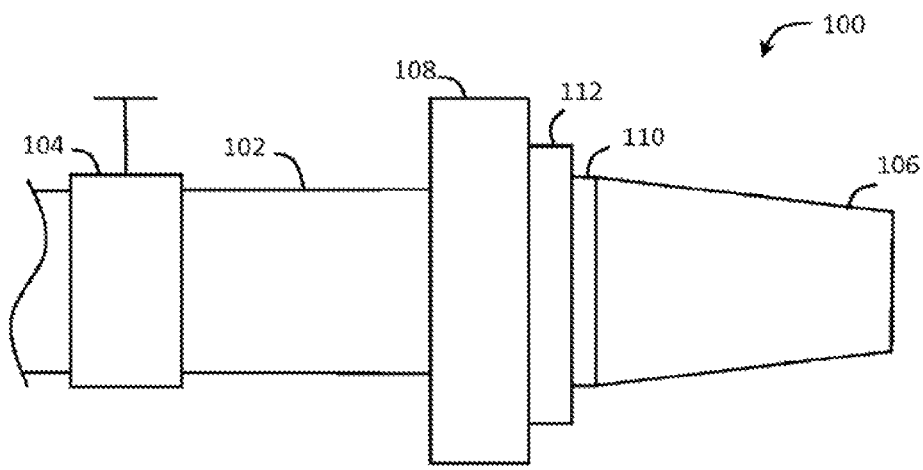
FIG. 1A is a schematic side view of an arrestor according to one embodiment.

FIG. 1A is a schematic side view of an arrestor 100 according to one embodiment. The arrestor 100 of FIG. 1A fits into an end of a leaking pipe to facilitate stopping the leak. The arrestor 100 comprises a spool 102 with a block valve 104. The spool 102 is coupled to a tapered fitting 106, which is tapered to facilitate mating with an open end of a riser, which is generally the same diameter as the spool 102. It should be noted that the arrestor 100 of FIG. 1A may be sized to fit a particular leaking riser, if desired. The tapered fitting 106 enters the pipe riser, penetrating until the spool 102 contacts the pipe riser at an end 110 of the spool 102 that couples to the tapered fitting 106. The spool 102 may contact the pipe riser by abutting an edge of the pipe riser or the end of the pipe riser may nest inside the end 110 of the spool 102.

A magnetic collar 108 disposed around the spool 102 generates a magnetic field within the spool 102 that creates an attractive magnetic force between the spool 102 and the pipe riser. The attractive force increases the contact force between the spool 102 and the pipe riser, improving the seal therebetween. The magnetic collar 108 also generates an attractive magnetic force between the arrestor 100 and the pipe riser. The magnetic collar 108 may be a permanent magnet, or preferably an electromagnet. When using an electromagnet, the arrestor 100 may be positioned with the tapered fitting 106 inside the pipe riser, and then the magnetic collar 108 may be energized to generate an attractive force between the spool 102 and the pipe riser. The attractive force seals the joint between the spool 102 and the pipe riser. If desired, the block valve 104 may be opened to admit fluids from the pipe riser into the arrestor 100 to be collected. The block valve may be left open while the arrestor is secured in place by the magnetic force. The magnetic force may also be used to hold the arrestor in place while it is welded to the pipe riser.

The tapered fitting 106 may be formed integral with the spool 102, may be welded to the spool at the end 110, or may have a cylindrical insert portion that fits within the spool 102 and is welded to an inner wall of the spool 102. The degree of tapering of the tapered fitting 106 may be selected to meet the requirements of different embodiments, but in most embodiments, the taper will be slight. In one example, the spool 102 has a 6 inch diameter, and the tapered fitting 106 extends beyond the end 110 of the spool 102 by about 18 inches. In this embodiment, the degree of tapering is between about 1/10 inch and about 1/4 inch reduction in diameter. The tapering is generally linear, but may be non-linear in alternate embodiments.

Figure 1B:
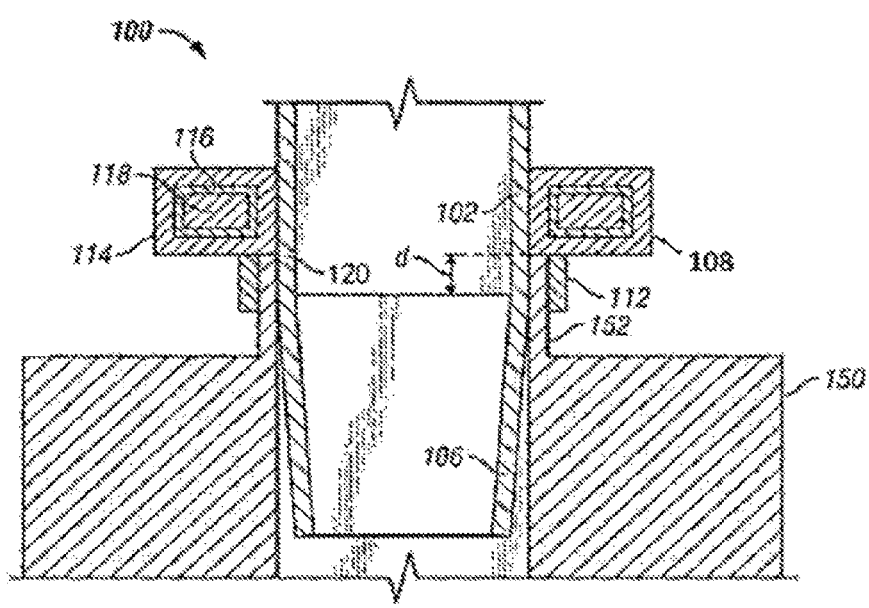
FIG. 1B is a cross-sectional detail view of the arrestor of FIG. 1A.

FIG. 1B is a cross-sectional detail view of the arrestor 100 of FIG. 1A. In the embodiment of FIG. 1B, the tapered fitting 106 is formed integral with the spool 102. In FIG. 1B the arrestor 100 is shown in mating relationship to a blowout preventer 150, which is in turn coupled to a pipe riser 152. In FIG. 1B, the arrestor 100 has a ring 112 coupled to the magnetic collar 110, the ring 112, magnetic collar 110, spool 102, and tapered fitting 106 cooperatively forming a recess for accommodating the pipe riser 152. Such construction will also accommodate a pipe riser without a blowout preventer. While the arrestor 100 is held against the pipe riser 152 and blowout preventer 150, the ring 112 may be welded to the pipe riser 152 for improved seal.

In the embodiment of FIG. 1B, the magnetic collar 108 comprises a housing 114, a conductor 116, and a core 118. The conductor 116 and core 118 constitute a magnetic assembly that may be an electromagnet. The core 118 is generally a magnetic field enhancing material, such as ferrite. The housing 114 may be any suitable structural material, such as metal, which may be lined with a dielectric material if the conductor 116 carries an electric current.

The tapered fitting 106 and the spool 102 define an angle point 120, at which the diameter of the tapered fitting 106 begins to decline. When the magnetic collar 108 is placed proximate the pipe riser 152, the magnetic force between the magnetic collar 108 and the pipe riser 152 pulls the magnetic collar 108, along with the spool 102, toward the pipe riser 152 and the blowout preventer 150, creating a sealing force at the point of contact between the magnetic collar 108 and the pipe riser 152. The angle point 120 is generally inside the pipe riser 152 when the magnetic collar 108 contacts the pipe riser 152 to ensure the best seal. The angle point 120 may extend into the pipe riser 152 any convenient distance, but in most embodiments, the extension length will be between about ¼ and 1 pipe diameters. For example, in a 6 inch pipe system (i.e. the inner diameter of the pipe riser 152 is 6 inches), the angle point 120 will extend into the pipe riser 152 between about 1.5 inches and about 6 inches, such as about 3 inches.

Figure 2A:
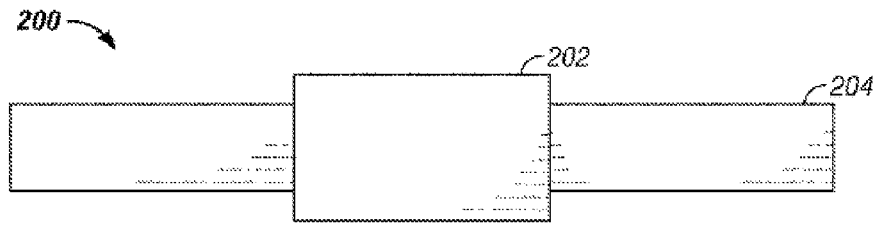
FIG. 2A is a schematic side view of a leak management apparatus according to another embodiment.

FIG. 2A is a schematic side view of a leak management apparatus 200 according to another embodiment. The apparatus 200 comprises an electromagnet 202 positioned proximate a riser pipe 204 for a well. The electromagnet 202 is positioned proximate a leaking portion (not shown in FIG. 2A) of the riser pipe 204 to facilitate plugging the leak. The leaking portion may be a side portion or an end portion of the riser pipe 204. A ferromagnetic fluid is provided to the interior of the riser pipe 204, and the electromagnet 202 is energized. The electromagnet 202 generates a magnetic field inside the riser pipe 204, at least a portion of which is substantially perpendicular to a central axis of the riser pipe 204. The lines of magnetic force propel the ferromagnetic material in the riser pipe 204 toward a leaking wall, for example the external wall, of the riser pipe 204, creating a layer of magnetically hardened material lining the interior wall of the riser pipe 204 and covering the leaking portion. In an embodiment wherein the riser pipe 204 is leaking from an end portion thereof, the electromagnet 202 may be positioned proximate the end portion, or at any point along the pipe spaced apart from the end portion, and when energized will accumulate the ferromagnetic fluid inside the riser pipe 204 to stop or reduce the leak from the end portion.

Figure 2B:
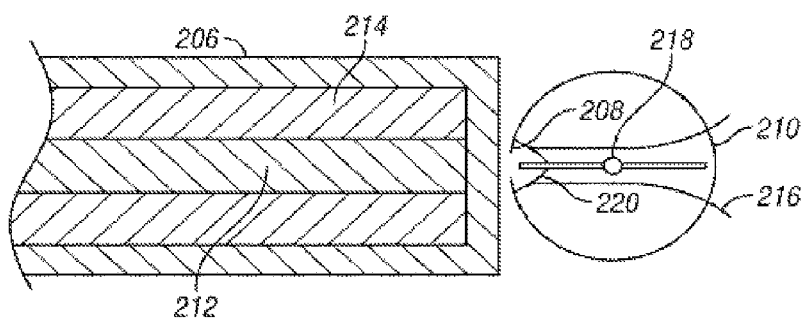
FIG. 2B is a schematic end view of a leak stopping apparatus according to another embodiment.

FIG. 2B is a schematic end view of a leak stopping apparatus according to one embodiment. A magnet 206, which may be an electromagnet or a permanent magnet, is positioned proximate a leaking portion 208 of a pipe riser 210, which may be a well bore. The magnet 206 may have a core 212, for example ferrite, for amplifying a magnetic field formed therein, and a coil 214 for generating a magnetic field 216 perpendicular to a central axis 218 of the pipe riser 210. Magnetically active material, such as a slurry of ferromagnetic material for example hematite or iron filings or fragments in oil or drilling fluid, is injected into the riser pipe 210, and the magnetic field 216 propels the magnetically active material toward the wall 220 of the pipe riser 210, covering and sealing the leaking portion 208 thereof.

In one embodiment, the magnetically active material accumulates in the pipe riser 210 at a location adjacent the magnet 206 to form a flow restriction or plug inside the pipe riser 210. The plug is formed and held in place by magnetic force from the magnet 206. Such a flow restriction may enable a plug or kill mixture to be pumped into the pipe riser 210 without being ejected from the pipe riser 210 by the pressure of the fluid flowing therein.

In another embodiment, a side wall leak may be magnetically sealed by providing a magnet, which may be an electromagnet or permanent magnet, shaped to follow an outside surface of a pipe riser such as the pipe riser 210. A seal or gasket may be attached to an edge of the magnet such that the seal or gasket continuously contacts the outside surface of the pipe when the magnet is in proximity to the pipe. The magnet may be placed over the side wall leak, with the seal gasket surrounding the leak. The magnetic force between the magnet and the pipe wall attracts the magnet toward the pipe wall, creating a sealing force between the seal or gasket and the pipe wall. Such a device may be used to stop a leak in a gas, oil, water, or other pipe quickly until a permanent repair can be made.

Figure 2C:
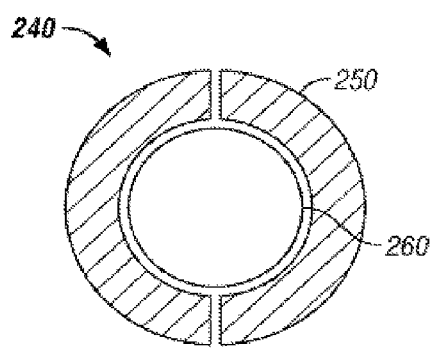
FIG. 2C is a schematic end view of a leak stopping apparatus according to another embodiment.

FIG. 2C is a schematic end view of a leak stopping apparatus 240 according to another embodiment. The embodiment of FIG. 2C features a semi-circular magnet 250 disposed around a partial circumference of a pipe riser 260. The pipe riser 260 may have a side wall leak that is desirous of sealing, as described above, or may be desirous of plugging or killing. The magnet 250 may be used to provide a side wall seal using an edge gasket and/or a magnetically active slurry, or to provide a flow restriction or plug of magnetically active material inside the pipe riser 260, as described above.

It should be noted that the magnetically active material to be provided to the interior of the pipe for magnetically sealing a leak is preferably not magnetized, or has only a weak magnetic moment, before it is pumped into the pipe. The magnetic moment of the material should be less that than required to immobilize the material inside the pipe so that the material will flow to the point in the pipe at which the magnet is activated.

While the foregoing is directed to embodiments of the invention, other and further embodiments of the invention may be devised without departing from the basic scope thereof.

What is claimed is:

1. A method comprising:
   contacting a riser with an arrestor comprising a spool, a magnetic collar, a ring and a valve, while maintaining the valve in an open position, wherein the magnetic collar contains an electromagnet and the ring is coupled to the magnetic collar such that a recess is formed between the ring and the spool;
   aligning the arrestor with the riser until the riser is within the recess and the magnetic collar contacts the riser;
   activating the electromagnet such that magnetic force between the magnetic collar and the riser maintains the arrestor's position with respect to the riser;

permanently securing the arrestor to the riser; and
closing the valve once the arrestor is secured such that flow from the riser is obstructed.

2. The method of claim 1 wherein the magnetic collar comprises an electromagnet.

3. The method of claim 2 further comprising activating said electromagnet once the magnetic collar contacts the riser.

4. The method of claim 1 wherein the spool has a diameter equal to or less than the diameter of the riser.

5. The method of claim 1 wherein the spool comprises a tapered fitting configured to fit within the riser.

6. The method of claim 1 wherein the spool has a diameter equal to or greater than the diameter of the riser.

* * * * *